Patented Oct. 31, 1950

2,528,346

UNITED STATES PATENT OFFICE 2,528,346

LUBRICANT COMPOSITIONS CONTAINING DIALKYL DISELENIDES

George H. Denison, Jr., Oakland, and Paul C. Condit, Berkeley, Calif., assignors to California Research Corporation, San Francisco, Calif., a corporation of Delaware No Drawing. Application June 4, 1945, Serial No. 597,594

5 Claims. (Cl. 252—45)

This invention relates to the improvement of hydrocarbon lubricating oils and other organic substances which are susceptible to deterioration when exposed to oxygen at elevated temperatures, by incorporating therein small amounts of certain aliphatic selenium compounds.

This application is a continuation-in-part of our copending applications Serial Nos. 476,760 (filed February 22, 1943), now Patent No. 2,398,415, issued April 16, 1946, and 486,306 (filed May 10, 1943), now Patent No. 2,398,416, issued April 16, 1946.

The stabilization of oxidizable organic substances is commonly effected by adding thereto a small amount of an oxidation inhibitor. Thus, it is now a common practice to add to an oxidizable organic substance a small amount, 0.1% or less to 1% or more, by weight, of a sulfur compound such as dicetyl sulfide, or a phenolic compound such as 2,6-ditertiary butyl p-cresol, or a nitrogen compound such as α-naphthylamine. These and other stabilizers or oxidation inhibitors are added to mineral lubricating oils, fatty oils, rubber, etc.

It is desirable that the stabilizer or inhibitor be easily and economically prepared in commercial quantities from readily available materials; that it be soluble in the material to which it is added; that it be stable and non-corrosive; that it be potent in its stabilizing and inhibiting action; and that it have a long life as a stabilizer or inhibitor.

It is an object of the present invention to stabilize oxidizable organic substances.

It is a particular object of the invention to stabilize hydrocarbon lubricating oils against oxidation.

It is a further object of the invention to provide a class of stabilizers or oxidation inhibitors which are easily and economically prepared from readily available materials.

It is a still further object of the invention to provide a class of stabilizers or oxidation inhibitors which are soluble in viscous hydrocarbon oils and other organic substances of similar solvent properties.

It is a still further object of the invention to provide a class of stabilizers or oxidation inhibitors which are stable and non-corrosive.

It is a still further object of the invention to provide a class of stabilizers or oxidation inhibitors which are potent in their stabilizing and inhibiting action.

It is a still further object of the invention to provide a class of stabilizers or oxidation inhibitors which have a long life in their intended use as stabilizers or inhibitors.

It is a still further object of the invention to provide a class of stabilizers or oxidation inhibitors which combine several desirable properties such as ease of preparation, oil-solubility, stability and non-corrosiveness, potency and long life.

It has been discovered that the aliphatic diselenides, compounds of the formula

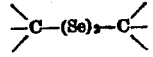

wherein the carbon atoms shown are aliphatic carbon atoms, are potent stabilizers or oxidation inhibitors for oxidizable organic substances.

Some of the aliphatic diselenides herein disclosed are old per se while others are new. They are all easily prepared from readily available materials, the principal cost factor being the cost of selenium. All or nearly all of the most easily available, unsubstituted aliphatic diselenides (those in which the aliphatic groups are purely hydrocarbon) are readily soluble in hydrocarbon lubricating oils and other organic substances having similar solvent properties. They are relatively stable and non-corrosive. They are very potent oxidation inhibitors and have an unusually strong stabilizing effect on mineral lubricating oils and the like. In this respect, it is believed that the aliphatic diselenides are no more potent on an equivalent selenium basis than the aliphatic monoselenides (seleno ethers —R—Se—R) which are disclosed and claimed in our copending application, Serial No. 476,760, but since the diselenides contain much more selenium (in the higher molecular weight compounds, almost twice as much selenium) than the analogous monoselenides, they offer the advantage that much more selenium can be incorporated in an oil or other oxidizable substance, per weight of added selenium compound, than can be incorporated when adding the same weight of monoselenide.

Among the presently available methods of preparing the diselenides, which, as stated, are an important factor in the commercial utility of an oxidation inhibitor, are the following:

(1) By condensing sodium diselenide (or potassium diselenide) with an aliphatic halide. The reaction is as follows:

$$2RCl + Na_2Se_2 \rightarrow R(Se)_2R + 2NaCl$$

This method is illustrated by the preparation of dioctadecyl diselenide described below in Example 2.

(2) By oxidation of a seleno mercaptan:

$$2R-Se-H + O \rightarrow R-Se-Se-R + H_2O$$

This method may be carried out by contacting the seleno mercaptan with air or oxygen. The structure of the product is believed to be as shown, but we do not know definitely whether the diselenides of the invention have the —Se—Se or the $$\begin{array}{c}-Se-\\\parallel\\Se\end{array}$$

group or are mixtures of both types of compound.

(3) An alkali metal seleno cyanate (e. g., NaSeCN) is converted to an aliphatic seleno cyanate, which can be converted to a diselenide by treating with caustic alkali in aqueous alcohol. The reactions involved are $$R \cdot Cl + NaSeCN \rightarrow RSeCN + NaCl$$

$$2RSeCN \xrightarrow{NaOH} R-(Se)_2-R + (CN)_2$$

This reaction is illustrated by the preparation of dilauryl diselenide described in Example 1 below. The advantages of this method are two-fold: First, it is not necessary to prepare sodium diselenide, which, by previously known methods, is troublesome to prepare and involves the use of metallic sodium. Second, the final reaction products are the desired diselenide and cyanogen gas, the latter being easily removed without leaving an impurity.

(4) By heating an aliphatic monoselenide with an equivalent weight of selenium:

$$R-Se-R + Se \rightarrow R-(Se)_2-R$$

In the above equations, R represents an aliphatic radical (including aryl substituted aliphatic radicals such as the benzyl radical) and the two R's in a given compound may be the same or different radicals.

The diselenides of the invention have this further advantage: As noted, they contain more selenium per given weight of compound than the monoselenides. On the other hand, they are more stable than tri- and higher polyselenides (R—Se₃—R, R—Se₄—R, etc.); these latter split off free selenium readily, or behave like free selenium, which is in many cases undesirable because the free selenium discolors the substance stabilized or metal surfaces contacted by the stabilized material. Thus, the diselenides, although less stable than the monoselenides, are sufficiently stable for many purposes and represent in certain cases an optimum balance between maximum stability (exhibited by the monoselenides) and maximum selenium content (exhibited by the tri- and higher polyselenides).

Also, the aliphatic diselenides are more advantageous than the aromatic or even the mixed aromatic-aliphatic diselenides, for they are more easily prepared and are more potent oxidation inhibitors.

Examples of suitable aliphatic diselenides are dipropyl, di-n-butyl, di-isobutyl, di-n-amyl, di-iso-amyl, dihexyl, diheptyl, dioctyl, didecyl, dilauryl, dicetyl, dibenzyl, di-cetylbenzyl and dicyclohexyl diselenides; mixed diselenides such as methyl propyl, cetyl ethyl and butyl benzyl diselenides; mixtures of diselenides such as produced when a halogenated mixture of hydrocarbons such as chlorinated naphtha, chlorinated kerosene or chlorinated paraffin wax is used as the reactant RCl in methods (1) and (3) above; and aliphatic diselenides having non-hydrocarbon substituents on the hydrocarbon radicals, such as chlorine, bromine, hydroxyl and amino.

The preferred diselenides are those containing not less than 8 nor more than 30 carbon atoms in each hydrocarbon (or substituted hydrocarbon) radical. Thus, these compounds are oil-soluble and are not appreciably volatile at temperatures of about 300° F. Also, they are easily prepared from readily available, non-volatile liquid or solid materials.

The diselenides may be used in amounts as low as 0.01% or less or as high as 5% or more, but preferably they are used in amounts of 0.1 to 2%, percentages being by weight based on finished composition. Concentrates or stock solutions containing 50% or more of diselenide dispersed in an organic liquid (e. g., mineral lubricating oil) may be prepared for later blending with the substance to be stabilized to produce a finished product.

Illustrative of organic substances to which the diselenides may be added as stabilizers are petroleum products such as gasoline, kerosene, lubricating oils and mineral oil-soap greases; fats, fatty oils, rubber, aldehydes, ethers, terpenes, mercaptans, phenols and synthetic plastic or resinous materials such as urea-formaldehyde, polyvinyl and phenol-formaldehyde resins. These and other organic materials undergo oxidation and deterioration (e. g., discoloration, sludge formation, thickening, etc.) under conditions ranging from mere exposure to air at normal atmospheric temperatures to intimate admixture with air or other oxidizing gases at temperatures of 300°–400° F. The inherent stability of the organic material toward oxidation will, of course, vary with the material. The selenium compounds of the invention will stabilize such materials under mild to extreme conditions of oxidation.

The following specific examples will serve to illustrate the practice and advantages of the invention.

*Example 1.*—Dilauryl diselenide $$(C_{12}H_{25}-(Se)_2-C_{12}H_{25})$$

was prepared as follows: 10 grams of lauryl seleno cyanate ($C_{12}H_{25}SeCn$) were dissolved in 25 cc. of alcohol and the solution was cooled to 32° F. Two cc. of 50% aqueous NaOH were diluted with 10 cc. of alcohol and similarly cooled. On mixing the two solutions a clear solution resulted which, however, began to deposit a solid in about 10 seconds and the solution then set to a solid. An additional 25 cc. of alcohol were stirred in and the mixture was allowed to stand at 40° F. for 2 hours. It was then poured into water and the oil that separated was extracted with ethyl ether. The ethyl ether extract was washed with water and dried over sodium sulfate and the ether removed by evaporation. The residue was crystallized from a mixture of ether and alcohol. The resulting product consisted of fine, pale yellow plates melting at about 21° C.

*Example 2.*—Dioctadecyl diselenide was prepared as follows: A mixture of 2 gram moles of sodium diselenide, 2 gram moles of octadecyl chloride and one liter of 95% ethyl alcohol were refluxed and stirred for nine hours. The reaction mixture was diluted with one liter of water and extracted with petroleum ether. The petroleum ether extract was dried over anhydrous sodium sulfate, filtered and concentrated on a steam bath. Two volumes of a 50% mixture of petroleum ether and acetone were added and the solution was cooled to promote crystallization of the dioctadecyl diselenide. A yield of 602 grams of dioctadecyl diselenide was obtained in the form of lemon yellow crystals melting at 52° C. to 55° C. Analysis. Found; % Se=22.3. Theoretical; % Se=23.8.

*Example 3.*—A highly refined SAE 30 Western oil and the same oil containing dissolved therein 0.1% by weight of dilauryl diselenide were submitted to an oxidation test in apparatus of the type described by Dornte in "Industrial and Engineering Chemistry," vol. 28, page 26 (1936), oxygen being absorbed by the oil under test at 340° F. Results are set forth in Table I below, the figures in the second and third columns denoting cc. of oxygen absorbed by 100 cc. of oil. For comparison, data on dicetyl sulfide and diphenyl selenide at concentrations of 0.1% by weight are also set forth in the table.

Table I

| Time, Hrs. | Nil | Oxygen Absorbed by Base Oil Plus | | |
|---|---|---|---|---|
| | | Dilauryl Diselenide | Dicetyl Sulfide | Diphenyl Selenide |
| 0.05 | 33 | | | |
| 0.15 | | | 20 | 0 |
| 0.20 | 96 | | | |
| 0.25 | 522 | | | |
| 0.30 | 1,746 | | | 458 |
| 0.35 | | | 506 | 1,048 |
| 0.40 | | | 1,380 | |
| 0.45 | | | 2,436 | |
| 0.50 | | | | 1,706 |
| 1.50 | | 0 | | |
| 2.50 | | 21 | | |
| 3.50 | | 40 | | |
| 4.50 | | 117 | | |
| 4.90 | | 207 | | |
| 5.10 | | 850 | | |

*Example 4.*—Dioctadecyl diselenide was submitted to the same oxidation test, the diselenide being dissolved in the amount of 0.08% by weight in medicinal grade white oil. The "induction period" (time for 100 grams of oil to absorb 1200 cc. of oxygen) was found to be 2.5 hours. Under the same conditions, dicetyl sulfide had an induction period of only 0.15 hour while dicetyl selenide had an induction period of 2.6 hours, both the sulfide and selenide being used in the amount of 0.1% by weight.

One or more diselenides of the invention may be used as the only added material present in an oxidizable organic substance or they may be used in conjunction with other additives. For example, the diselenides of the invention may be used advantageously in mineral lubricating oils in conjunction with metal salts of organic acids and/or metal salts of organo-substituted inorganic acids. These salts are used to improve various properties of lubricating oils, such as detergency, stability against oxidation, film strength, etc. Examples of such metal salts are calcium, barium, zinc and aluminum salts of cetylphenol; calcium, barium, zinc and aluminum salts of diamyl diphenol monosulfide; calcium, barium, zinc and aluminum salts of mono- and dicetyl esters of phosphoric acid; calcium, barium, zinc and aluminum salts of mono- and dicetylphenyl esters of dithiophosphoric acids; calcium, barium, zinc and aluminum salts of naphthenic acids; calcium, barium, zinc and aluminum salts of oil-soluble petroleum (mahogany) sulfonic acids; calcium, barium, zinc and aluminum salts of dibutyl dithiocarbamic acid; calcium, barium, zinc and aluminum salts of the reduced petroleum nitrogen base dithiocarbamates of Miller and Rutherford United States Patent No. 2,363,012. Other metals (e. g., sodium, lithium, magnesium and cobalt) and other acid radicals (e. g., aryl carboxylic acid, fatty acid, aliphatic polycarboxylic and thiophenol radicals) may be used instead of the aforementioned calcium, barium, zinc and aluminum metals and the aforementioned phenate, phenate sulfide, phosphate, thiophosphate, naphthenate, sulfonate and dithiocarbamate radicals, respectively. Thus, from 0.1 to 2% of diselenide and from 0.1 to 2% of metal salt may be added to mineral lubricating oil, or greater amounts may be used to form a concentrate or stock solution. Further details concerning the conjoint use of diselenides and metal salts of organic and/or organo substituted inorganic acids in oils of lubricating viscosity, such as particular combinations of additives, results obtainable by such conjoint use, etc., may be found in our aforesaid copending application Serial No. 486,306, and such details are incorporated herein by reference.

The following example is illustrative of the beneficial effect of the diselenides of the invention in mineral lubricating oils in combination with metal salt additives.

*Example 5.*—A Western SAE 60 aviation grade oil compounded with about ⅓% of a sulfurized calcium alkyl phenate (the calcium cetyl phenate-sulfur reaction product of Etzler and Farrington United States Patent No. 2,360,302) and about 0.12% of calcium cetyl phosphate was submitted to the "Aluminum Dish Test." This test, which is very severe from the standpoint of gum formation, was carried out as follows: A weighed sample of oil (about 5 drops) was placed in an aluminum dish 2 inches in diameter which is flat on its lower face and slightly concave on its upper face, the dish having been thoroughly cleaned and dried before putting in the oil. The dish was then placed on an electric hot plate, the surface temperature of which was adjusted to the desired value. The dish was left on the hot plate for 20 minutes and was then removed and cooled to room temperature. The dish and deposit were then washed free of oil with petroleum ether and the residual gum was determined. The gum is expressed as percentage by weight of the original oil. Other oils submitted to the same test were the same compounded oil containing certain selenium compounds. Results are shown in Table II below.

Table II

| Oil | Selenium Additive | Gum formed at 550° F. | Gum formed at 600° F. | Gum formed at 650° F. |
|---|---|---|---|---|
| Compounded SAE 60 Oil. | Nil | 6.72 | 13.5 | 19.8 |
| Do | 2.0% dilauryl selenide. | 0.85 | 6.7 | 12.8 |
| Do | 2.0% dicetyl selenide | 0.01 | 0.37 | 8.8 |
| Do | 1.0% dicetyl diselenide. | 0 | 1.8 | 8.6 |

The diselenides of the invention may also be used advantageously in turbine lubricants and other industrial lubricants which are used to lubricate metal surfaces under conditions (such as intermixture of the lubricant with water) which promote rusting and corrosion of ferrous metal surfaces. It is now the practice to add to such lubricants both a corrosion or rust inhibitor and an anti-oxidant. Examples of corrosion or rust inhibitors are lauryl acid maleate and the products of condensing high molecular weight olefins with maleic anhydride and hydrating the resulting condensation product. The said olefin-maleic anhydride condensation-hydration products are described in Moser, United States Patents Nos. 2,124,628 and 2,133,734. The diselenides of the invention are especially advantageously used in turbine lubricants and others of the class just described, in conjunction with rust or corrosion inhibitors such as lauryl acid maleate or one of the aforesaid olefin-maleic anhydride condensation-hydration products. The diselenides cooperate with the rust or corrosion inhibitors to produce an oil which is both stable and rust inhibitive. Amounts of diselenide ranging from about 0.1% or less to 2% or more and of rust or corrosion inhibitors ranging from 0.005% or less to 2% or more, preferably 0.05 to 0.5%, may be used.

Moreover, the diselenides of the invention also function as film strengthening agents ("E. P." agents) in lubricants.

We claim:

1. A lubricant comprising a major proportion of oil of lubricating viscosity which is susceptible to deterioration when exposed to oxygen at elevated temperatures and a small amount, sufficient to inhibit such deterioration, of a dialkyl diselenide selected from the group consisting of dilauryl diselenide, dicetyl diselenide and diparaffin diselenide.

2. A lubricant comprising a major proportion of an oil of lubricating viscosity which is susceptible to deterioration when exposed to oxygen at elevated temperatures and a small amount, sufficient to inhibit said deterioration, of dilauryl diselenide.

3. A lubricant comprising a major proportion of an oil of lubricating viscosity which is susceptible to deterioration when exposed to oxygen at elevated temperatures and a small amount, sufficient to inhibit said deterioration, of diparaffin diselenide.

4. A lubricant comprising a major proportion of a mineral oil of lubricating viscosity and about 0.1 to 2% by weight based on finished lubricant of dilauryl diselenide.

5. A lubricant comprising a major proportion of a mineral oil of lubricating viscosity and about 0.1 to 2% by weight based on finished lubricant of dicetyl diselenide.

GEORGE H. DENISON, Jr.
PAUL C. CONDIT.

REFERENCES CITED

The following references are of record in the file of this patent:

UNITED STATES PATENTS

| Number | Name | Date |
|---|---|---|
| 2,158,668 | Rosen | May 16, 1939 |
| 2,359,270 | Shutt | Sept. 26, 1944 |
| 2,398,415 | Denison, Jr. et al. | Apr. 16, 1946 |